US007467476B2

(12) United States Patent
Digavero et al.

(10) Patent No.: US 7,467,476 B2
(45) **Date of Patent: *Dec. 23, 2008**

(54) MARKING SHEET FOR CUTTING DRYWALL

(76) Inventors: Philip A. Digavero, 16 Hilltop Trail, Denville, NJ (US) 07834; Eric C. Flora, 60 Morris Turnpike, Randolph, NJ (US) 07869

( * ) Notice: Subject to any disclaimer, the term of this patent is extended or adjusted under 35 U.S.C. 154(b) by 0 days.

This patent is subject to a terminal disclaimer.

(21) Appl. No.: 12/073,990

(22) Filed: Mar. 12, 2008

(65) Prior Publication Data

US 2008/0155845 A1 Jul. 3, 2008

Related U.S. Application Data

(63) Continuation-in-part of application No. 11/475,930, filed on Jun. 28, 2006, now Pat. No. 7,363,720.

(51) Int. Cl.
*G01B 3/14* (2006.01)

(52) U.S. Cl. ....................... 33/528; 33/563; 33/DIG. 10

(58) Field of Classification Search ................... 33/528, 33/562–563, 566; 428/488.11
See application file for complete search history.

(56) References Cited

U.S. PATENT DOCUMENTS

| | | | | | |
|---|---|---|---|---|---|
| 2,898,688 | A | | 8/1959 | Cottar | |
| 4,053,660 | A | * | 10/1977 | Hurwitz et al. | 428/488.11 |
| 4,212,110 | A | | 7/1980 | Hill, Jr. | |
| 4,259,785 | A | | 4/1981 | Wortham | |
| 4,345,381 | A | | 8/1982 | Brislin | |
| 4,367,252 | A | * | 1/1983 | Tordjman | 428/45 |
| 4,372,050 | A | | 2/1983 | Eisenhauer | |
| 4,544,430 | A | * | 10/1985 | Shepherd | 156/235 |
| 4,620,407 | A | | 11/1986 | Schmid | |
| 5,157,844 | A | | 10/1992 | Mallison | |
| 5,222,303 | A | | 6/1993 | Jardine | |
| 5,470,351 | A | * | 11/1995 | Ross et al. | 607/95 |
| 5,860,219 | A | | 1/1999 | Wilkinson | |
| 6,226,882 | B1 | | 5/2001 | Barr | |
| 6,434,848 | B1 | | 8/2002 | Gordon | |
| 6,463,668 | B1 | | 10/2002 | Williams | |
| 6,810,598 | B2 | | 11/2004 | Boys | |

(Continued)

FOREIGN PATENT DOCUMENTS

| | | |
|---|---|---|
| DE | 3602268 | 7/1987 |

(Continued)

*Primary Examiner*—Yaritza Guadalupe-McCall
(74) *Attorney, Agent, or Firm*—Richard C. Litman

(57) ABSTRACT

The marking sheet for cutting drywall provides an adhesive sheet having a marking layer formed of a transferable medium for transferring an image of an opening to the rear surface of a sheet of drywall. The user may then use the transferred image as a template for cutting an opening through the sheet of drywall. The marking sheet is dimensioned and configured to correspond to the opening, and is adhered to a building frame element defining the opening. The drywall is positioned against the marking sheet to form the image. The drywall is then removed from the marking sheet, and the user cuts the opening in the drywall. The marking sheet may be used to form openings in drywall for electrical boxes, for HVAC ducts, for plumbing pipes, for electrical conduit, or for window or door openings by marking the border of the window or door openings.

16 Claims, 9 Drawing Sheets

U.S. PATENT DOCUMENTS

| | | | |
|---|---|---|---|
| 6,865,819 | B2 | 3/2005 | Melittas |
| D504,336 | S | 4/2005 | Mason |
| 2002/0104228 | A1 | 8/2002 | Hill |
| 2004/0040167 | A1 | 3/2004 | Hall |
| 2004/0083617 | A1 | 5/2004 | Bielen |
| 2004/0101673 | A1 | 5/2004 | Schoppman |
| 2005/0011079 | A1 | 1/2005 | Sikora, Jr. |

FOREIGN PATENT DOCUMENTS

| | | |
|---|---|---|
| DE | 3621645 | 1/1988 |

* cited by examiner

MARKING SHEET FOR CUTTING DRYWALL

This application is a continuation-in-part of U.S. patent application Ser. No. 11/475,930, filed Jun. 28, 2006, now U.S. Pat. No. 7,363,720.

BACKGROUND OF THE INVENTION

1. Field of the Invention

The present invention relates to templates for use in building construction, and particularly to a marking sheet for cutting drywall that transfers an outline of an opening (e.g., an opening for an electrical outlet or switch, a ventilation duct, etc.) to be defined in a sheet of drywall so that the transfer provides an accurate cutting template for forming the opening.

2. Description of the Related Art

Drywall, also known as gypsum wallboard, and similar structural materials are commonly used in the construction of houses, buildings and other structures. Drywall, in particular, is susceptible to cracking, puncture, marring, and other damage, and often requires great care in the formation of openings within a drywall panel. Typically, in construction, receptacle housings, such as electrical outlet or switch boxes, are typically mounted on studs or other structural elements prior to the application of the drywall panels. Openings for the receptacle housings must then be formed through each drywall panel, which presents difficulty for the user, in that each opening must be created very carefully so as not to damage the drywall.

Further, the openings must be sized, contoured and properly placed over each respective receptacle housing. Otherwise, the user will have to start the construction process again with a new piece of drywall and the formation of another opening for the receptacle. Alternatively, the user must expend additional time and effort in the repair of the damaged drywall panel.

Although the user may measure the size, contour and position of a receptacle with a ruler or the like, and then manually mark this on the drywall panel with a pencil or similar implement, the user may make an error in the measurement, or may mark the drywall panel imprecisely. Templates made from paper or cardboard and applied to the exterior of the drywall after installation of the drywall are difficult to align properly with the structure defining the opening.

Thus, a marking sheet for cutting drywall solving the aforementioned problems is desired.

SUMMARY OF THE INVENTION

The marking sheet for cutting drywall is an adhesive sheet having a marking layer formed of a transferable medium, such as carbon particles, for transferring an image of a receptacle housing to the rear surface of a sheet of drywall. The user may then use the transferred image as a template for cutting a receptacle opening through the sheet of drywall.

The marking sheet includes a base sheet having opposed front and rear surfaces. The marking layer is formed on the front surface and an adhesive layer is formed on the rear surface. A releasable backing or cover sheet may be releasably adhered to the adhesive layer prior to application to the receptacle housing. Further, the marking sheet is dimensioned and configured to cover the receptacle housing, and is then adhered to the receptacle housing.

In use, the user removes the releasable cover sheet from the base sheet and then adheres the rear surface of the base sheet to the receptacle housing. The drywall is positioned against the receptacle housing and the marking layer to transfer an image of the receptacle housing to the rear surface of the sheet of drywall. Preferably, the user applies pressure to the front surface of the sheet of drywall in order to transfer the image. Once the image has been formed, the drywall is removed from the receptacle housing and the marking sheet, and the user cuts the receptacle opening about the transferred image.

The marking sheet may be furnished as individual sheets, in a long roll or tape that can be separated by cutting or tearing, or as a plurality of sheets joined together and separated by perforations, either as flat sheets or in rolls.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
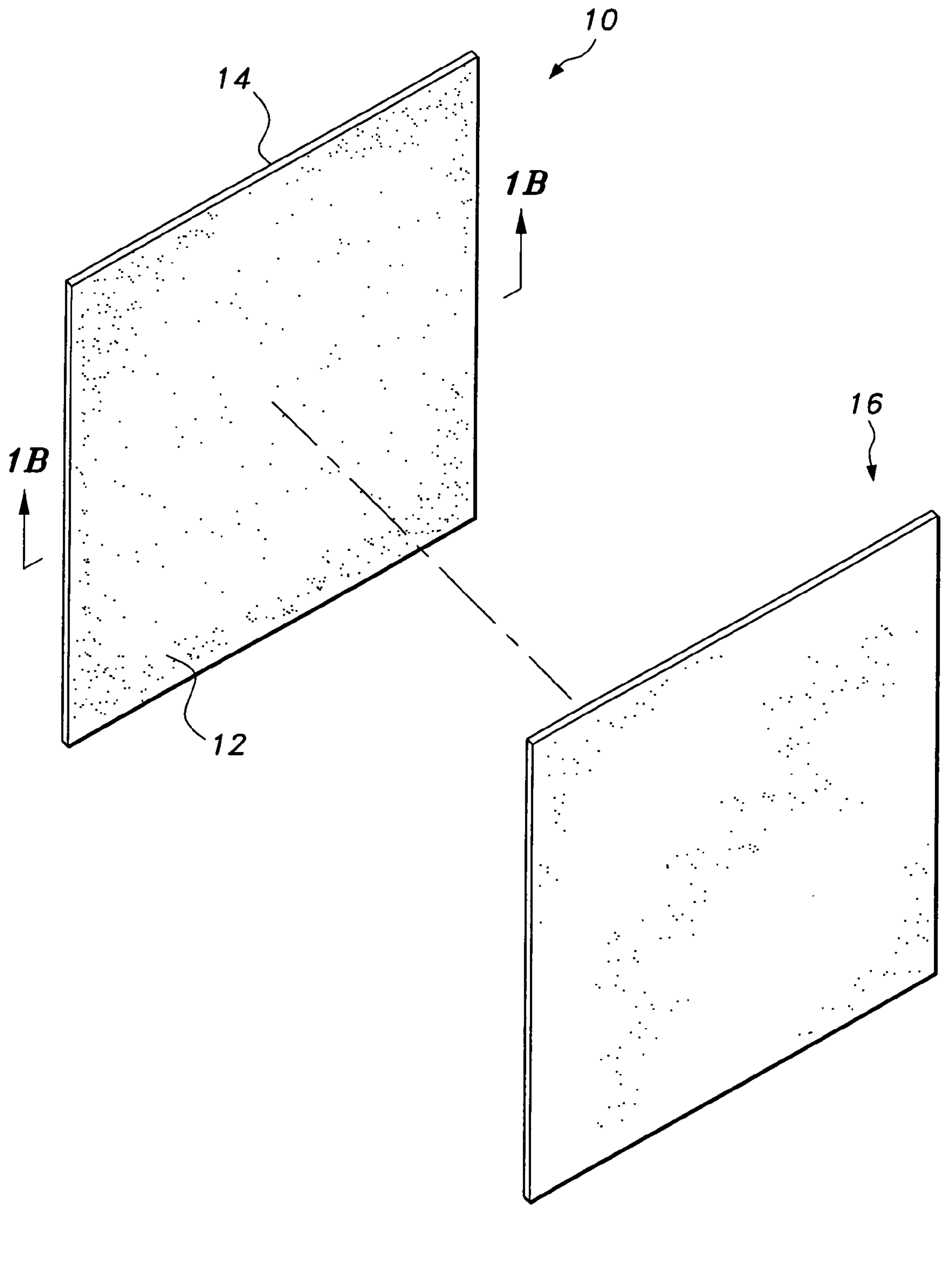
FIG. 1A is an exploded perspective view of a marking sheet for cutting drywall according to the present invention.
Figure 1B:
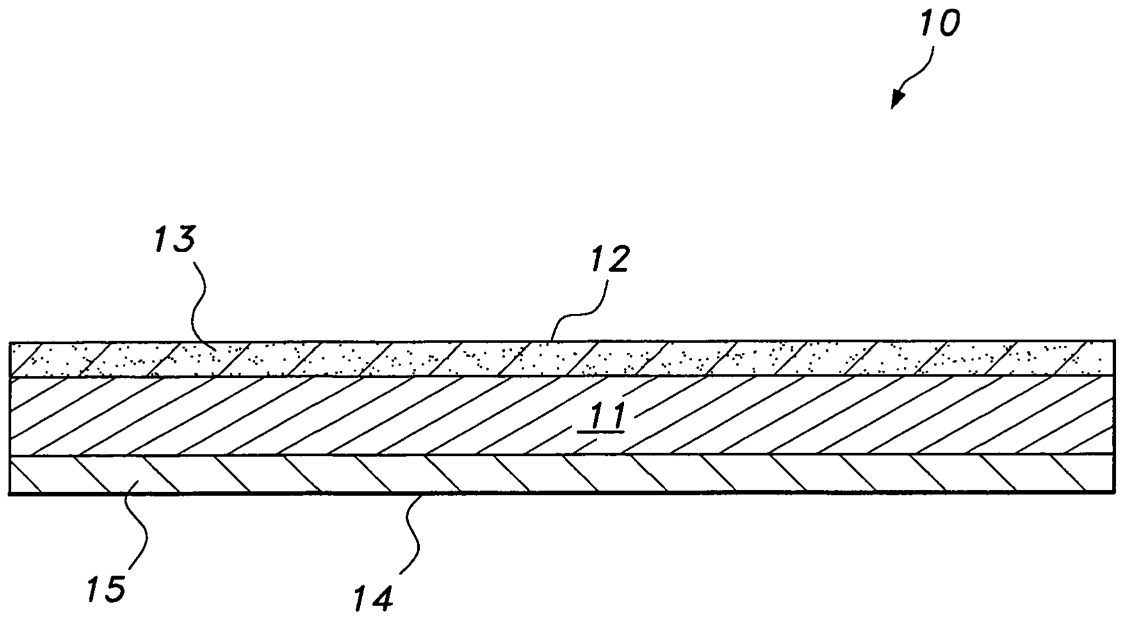
FIG. 1B is a section view along lines 1B-1B of FIG. 1A.

The present invention is directed towards a marking sheet 10 for cutting drywall. As shown in FIGS. 1A and 1B, the marking sheet 10 has a front surface 14 and a rear surface 12. The front surface 14 has a marking layer 15 formed thereon for transferring an image of an opening to a rear face of a drywall panel, as will be described in greater detail below. The marking layer 15 is formed from a transferable medium, such as ink, chalk, pigment, paint, carbon particles, wax, charcoal or the like, which is coated onto the front surface 14 in any conventional manner. The marking layer 15 may be formed from any suitable medium that will transfer an image to the rear face of the sheet of drywall upon application of pressure thereto, as will be described in detail below.

Figure 2:
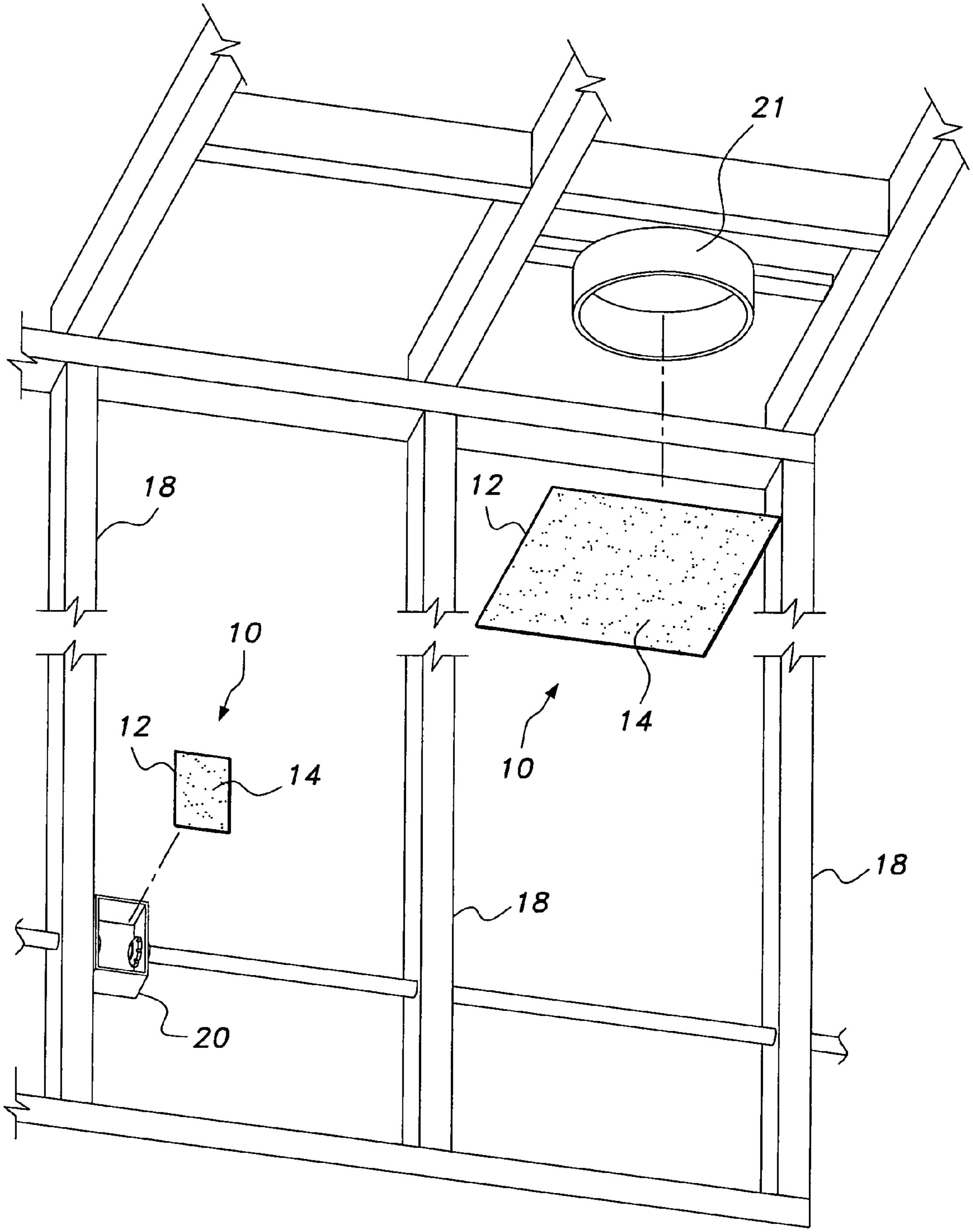
FIG. 2 is an environmental perspective view showing application of a marking sheet of the present invention to an electrical outlet box during the construction process.
Figure 6A:
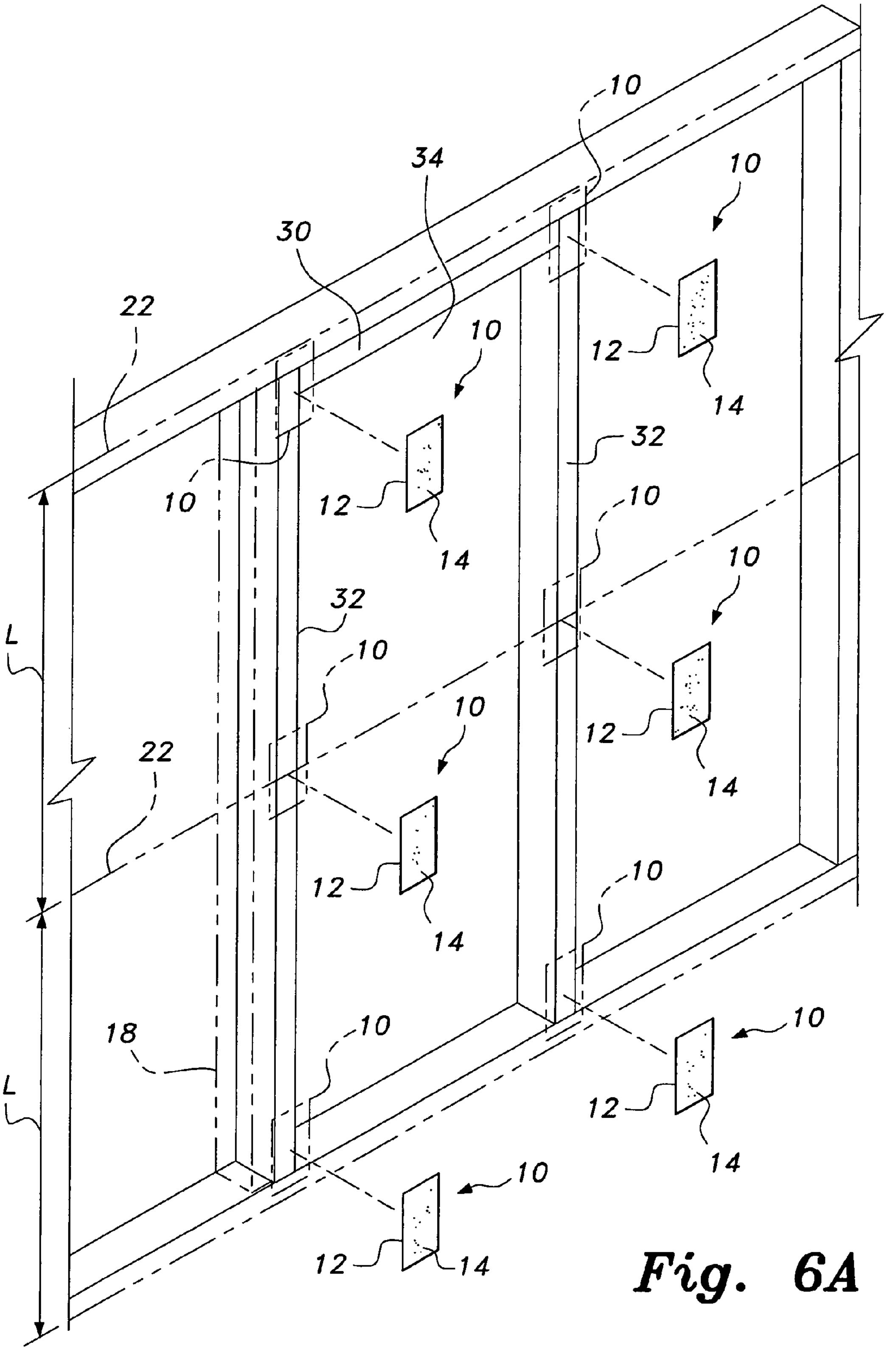
FIG. 6A is an environmental perspective view of an alternative method for using a marking sheet for cutting drywall according to the present invention for marking a door opening.
Figure 6B:
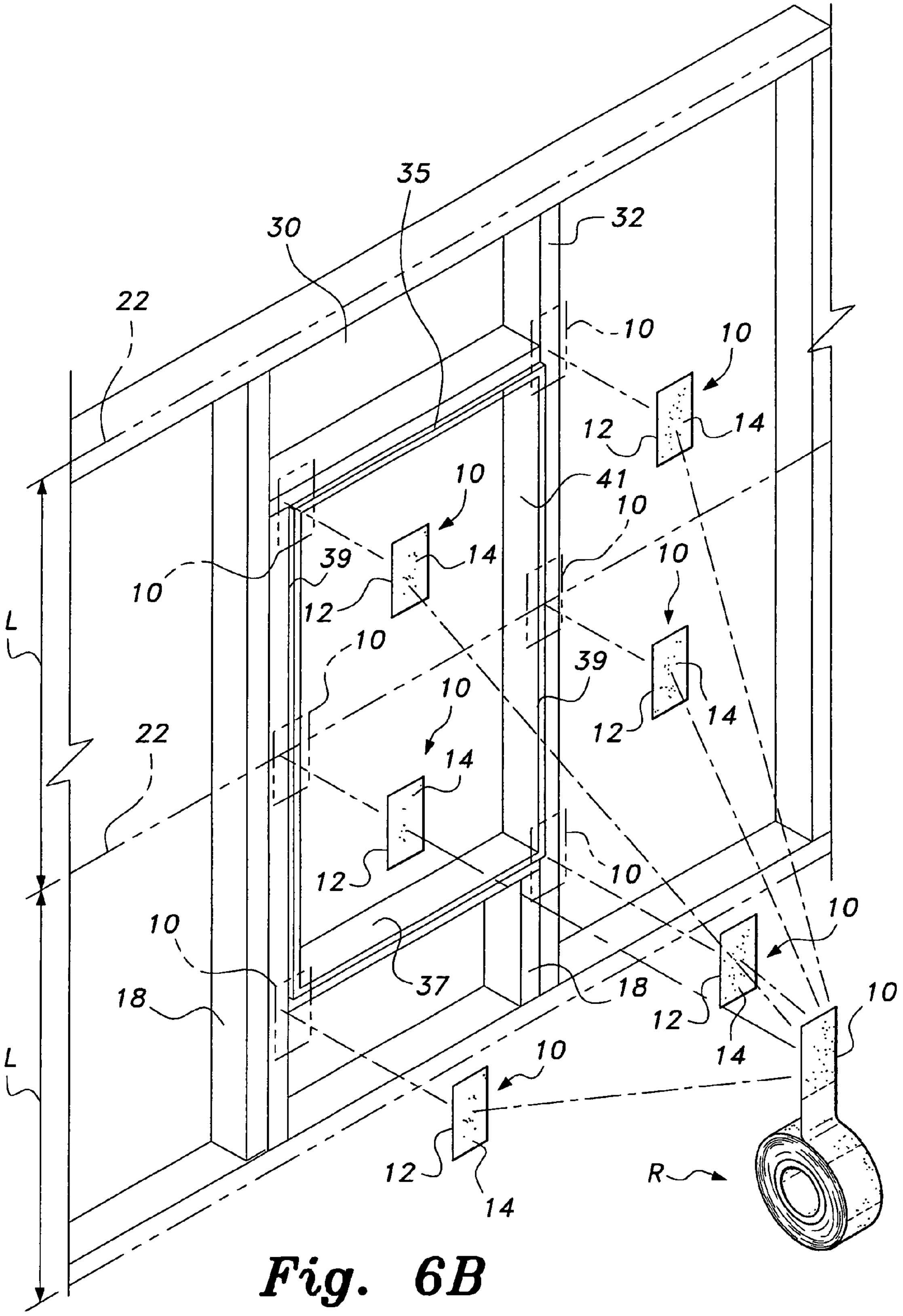
FIG. 6B is an environmental perspective view of an alternative method for using a marking sheet for cutting drywall according to the present invention for marking a window opening.
Figure 6C:
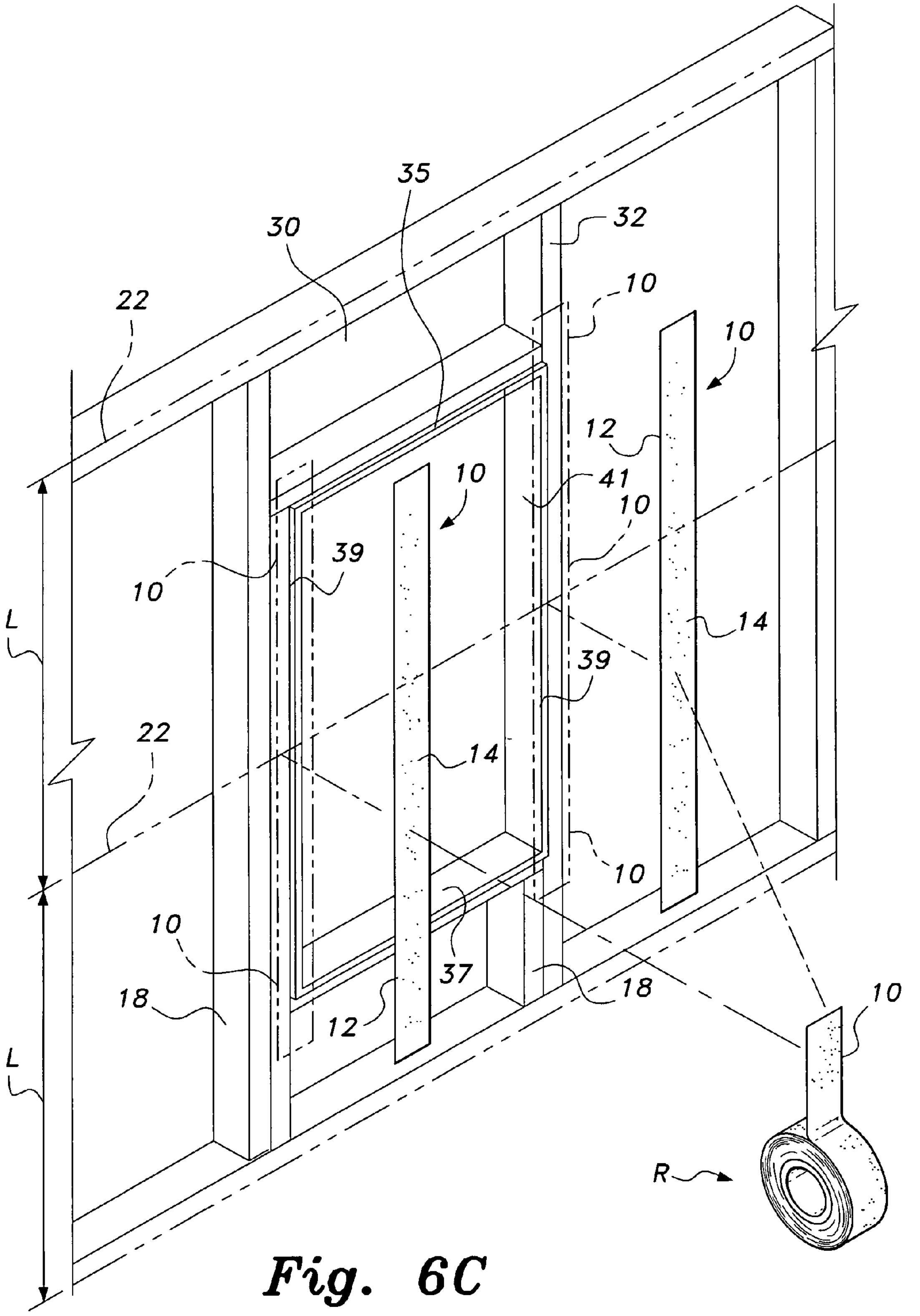
FIG. 6C is an environmental perspective view of another alternative method for using a marking sheet for cutting drywall according to the present invention for marking a window opening.

In the drawings, marking sheets 10 are shown being used in combination with drywall. It should be understood that marking sheets 10 may be used in combination with any desired work surface, such as plywood, backerboard, flooring, vinyl siding, aluminum siding, wood paneling, wonder board, ceramic tile, stone tile, and the like. Further, as will be described below, although FIG. 2 illustrates the sheets 10 being applied to an electrical box and a light fixture, and FIGS. 6A, 6B and 6C illustrate sheets 10 being applied to the framing forming a door and a window, respectively, it should be understood that sheets 10 may be used in combination with any desired work surface for application to any desired fixture or construction. For example, sheets 10 may be used to transfer marks for anchor bolts in fabricated steel columns, for application of kitchen counters, for the formation of plumbing openings in kitchen or bathroom vanities, or the like.

The rear surface 12 of the base sheet 11 is preferably covered or coated with an adhesive layer 13 in any conventional manner for releasably securing the marking sheet 10 to the opening. The opening may be defined by an electrical box for an electrical outlet or switch, by a duct for a ventilation system, by a pipe for a plumbing system, by a window frame or doorframe, by a recessed lighting fixture, or generally by any frame member defining the shape of a cutout. Instead of adhesive, the marking sheet 10 may be secured to the frame or housing member defining the cutout by any suitable releasable fastener. In the preferred embodiment, the adhesive layer 13 is formed on the rear surface 12 of the base sheet 11, and a backing or cover slip 16 is provided for releasably covering the adhesive layer 13 prior to application to the opening.

Figure 1C:
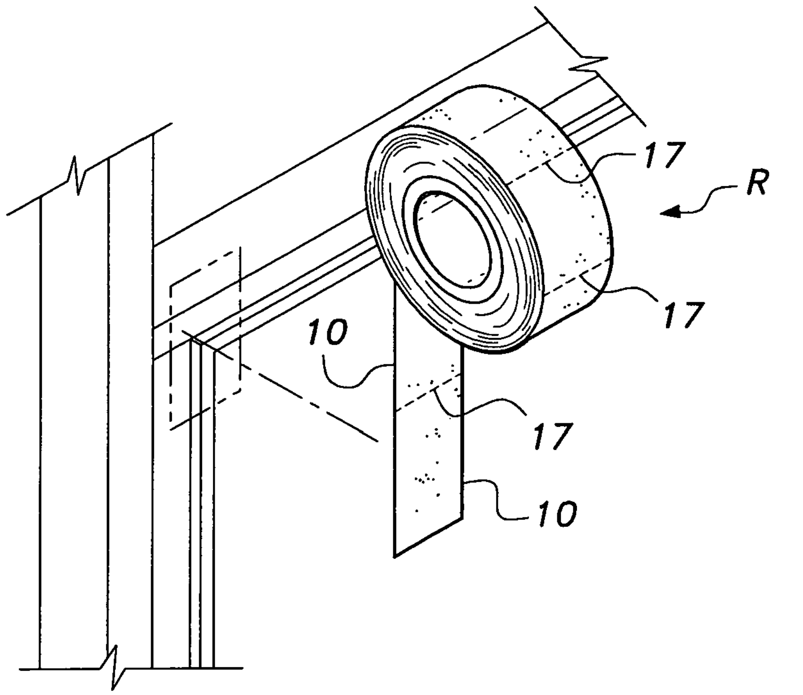
FIG. 1C is an environmental perspective view of an alternative embodiment of the marking sheet for cutting drywall according to the present invention, the sheet being furnished as a roll of sheets.

Sheets 10 may be provided as single sheets, such as those shown in FIGS. 1A and 1B, or may be provided on a roll R, as shown in FIG. 1C. Individual sheets 10 in the roll R are joined by perforated lines 17 along roll R, and the user tears each sheet 10, or a group of sheets to any desired length, from the roll R as needed. The individual sheets 10 preferably do not include cover sheets, but are adhered to one another in roll R in a manner similar to a conventional roll of adhesive tape, although the roll R may be formed from a elongated strip of sheets with cover sheets to separate the loops of the coil when the strip is wound to form the coil or roll R to prevent the transferable medium on the front of one sheet being transferred to the adhesive layer on the rear of another sheet in the next loop of the coil, if desired. Alternatively, a plurality of sheets 10 may be provided, joined to one another through perforations or the like, but provided as a strip in an unrolled fashion, or in rows and columns, preferably including cover sheets to cover the adhesive layers, so that the sheets may be separated individually or in groups to any desired length or width.

In FIG. 2, the marking sheet 10 is shown as being applied to a conventional electrical box 20 for an electrical outlet or receptacle. It should be understood that electrical box 20 is shown for exemplary purposes only, and that marking sheet 10 may be applied to any suitable framing element defining the opening, such as a recessed light fixture box or frame, a door or window frame (as will be described in greater detail below with reference to the embodiments of FIGS. 6A and 6B), a ventilation duct, a pipe, etc.

Marking sheet 10 is particularly useful in combination with ceiling mounted light fixtures having substantially circular contours, commonly referred to as “high hat” light fixtures. One such high hat light fixture 21 is shown in FIG. 2 mounted to a ceiling. Preferably, marking sheets 10 are either manufactured in a variety of custom sizes, such as a first size appropriate for covering housing 20 and a second size for covering fixture 21, or are provided in a bulk size that can be cut to any desired dimension or configuration by the user, according to the particular application.

The marking sheet 10 is dimensioned and configured to mate with and cover the edges of the framing element defining the opening. In the exemplary embodiment of FIGS. 2-5, the marking sheet 10 has a substantially rectangular contour and is sized to cover the edges of a conventional electrical box 20 for an electrical outlet or receptacle. The marking sheet 10 is formed to the required dimensions and configuration either during manufacture or by the user using scissors, a utility knife, or other cutting implement suitable for cutting the base sheet 11 (the base sheet 11 may be made from paper, plastic, cardboard, fabric or other suitable material). Individual sheets may be joined or linked together by the user to form a larger sheet for application to a larger receptacle, such as a box for multiple switch outlets.

In FIG. 2, electrical box 20 is mounted directly to a stud 18 with the opening facing the interior of the building structure. Prior to the application of drywall paneling, the user removes cover slip 16 from the adhesive layer 13, formed on rear surface 12 of the marking sheet 10, and adheres the rear surface 12 to the edges, mounting lugs (if so equipped), or other front surface of electrical box 20, as shown. The front surface 14, upon which the marking layer 15 or transferable medium is formed, faces outwardly; i.e., towards the interior of the building structure.

Once the marking sheet 10 has been releasably applied to housing 20, the user temporarily covers the studs 18, electrical box 20, and marking sheet 10 with a drywall panel 22, as shown. The drywall panel 22 may be temporarily secured to studs 18 through the use of screws or any other suitable means of releasable attachment. The rear face 24 of drywall panel 22 contacts the marking layer 15 of the marking sheet 10 to transfer an image of the outer perimeter of the electrical box 20 to the rear face 24 of drywall panel 22 (shown as transferred image 26 in FIG. 4).

Figure 3:
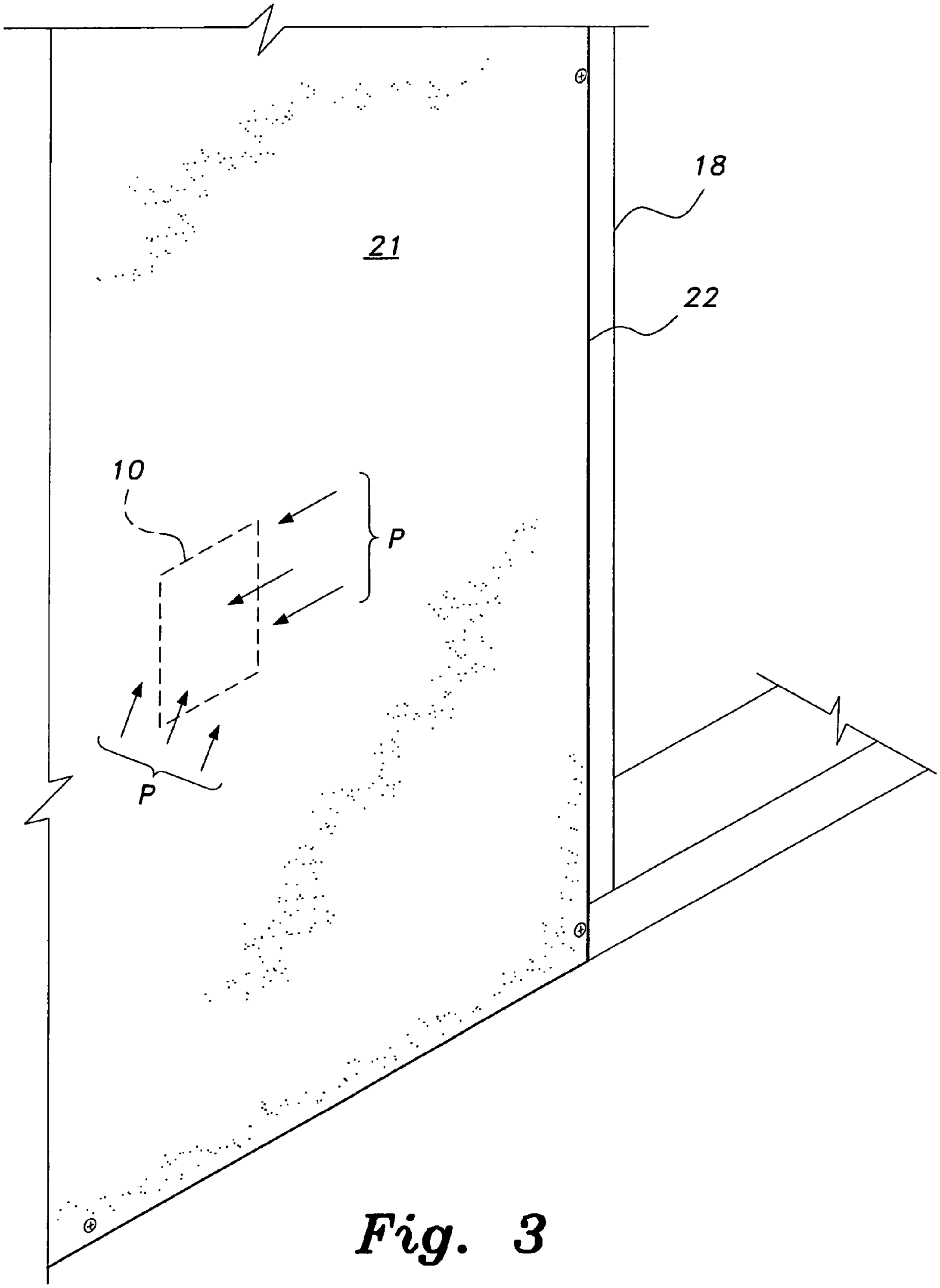
FIG. 3 is an environmental perspective view showing a sheet of drywall being pressed against the marking sheet of FIG. 2 to transfer an image of the outlet box to the rear face of the drywall.

While the drywall panel 22 covers the electrical box 20 and is in contact with the marking layer 15, the user may apply a force or pressure P (as shown in FIG. 3) to the front face 21 of drywall panel 22 adjacent the electrical box 20 in order to increase the quantity of the transferable medium forming the marking layer 15 that is transferred to rear face 24 and forms image 26. Preferably, the magnitude of pressure P is relatively low (and may be applied in the form of a gentle pat applied by the user’s hands, for example) in order to minimize the possibility of accidental damage to the drywall panel 22.

Figure 4:
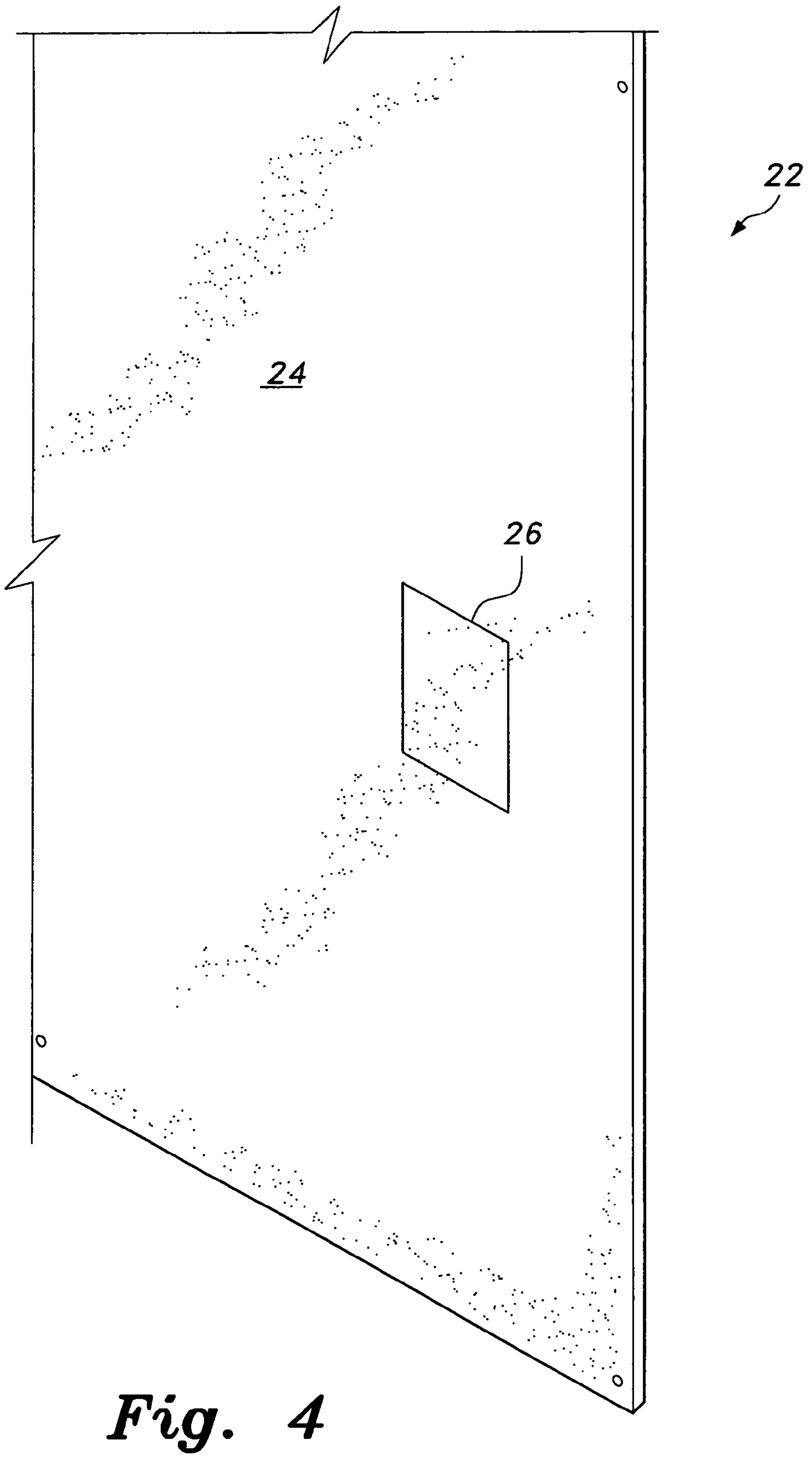
FIG. 4 is an environmental perspective view of the rear face of the drywall of FIG. 2, showing the image transferred to the drywall by the marking sheet of the present invention by the process shown in FIGS. 2 and 3.

Following the application of pressure P to form image 26, the user may then remove the panel 22 from studs 18 through the release of the screws or other releasable fasteners used to temporarily affix panel 22 to studs 18. As illustrated in FIG. 4, the rear face 24 of panel 22 has the transferred image 26 formed thereon. The user may then cut an opening through the drywall panel 22 using the transferred image 26 as a guide template so that the opening (designated by the reference numeral 28 in FIG. 5) is dimensioned and configured to match electrical box 20. The user may cut the opening 28 through any suitable conventional means for cutting openings through drywall paneling, and preferably the user will define a perimeter about the image 26, with the perimeter being spaced apart from the image 26 by approximately ⅛ of an inch. The user may then cut along the periphery, rather than along the actual image 26, to ensure that proper clearance is afforded about the electrical box 20.

Figure 5:
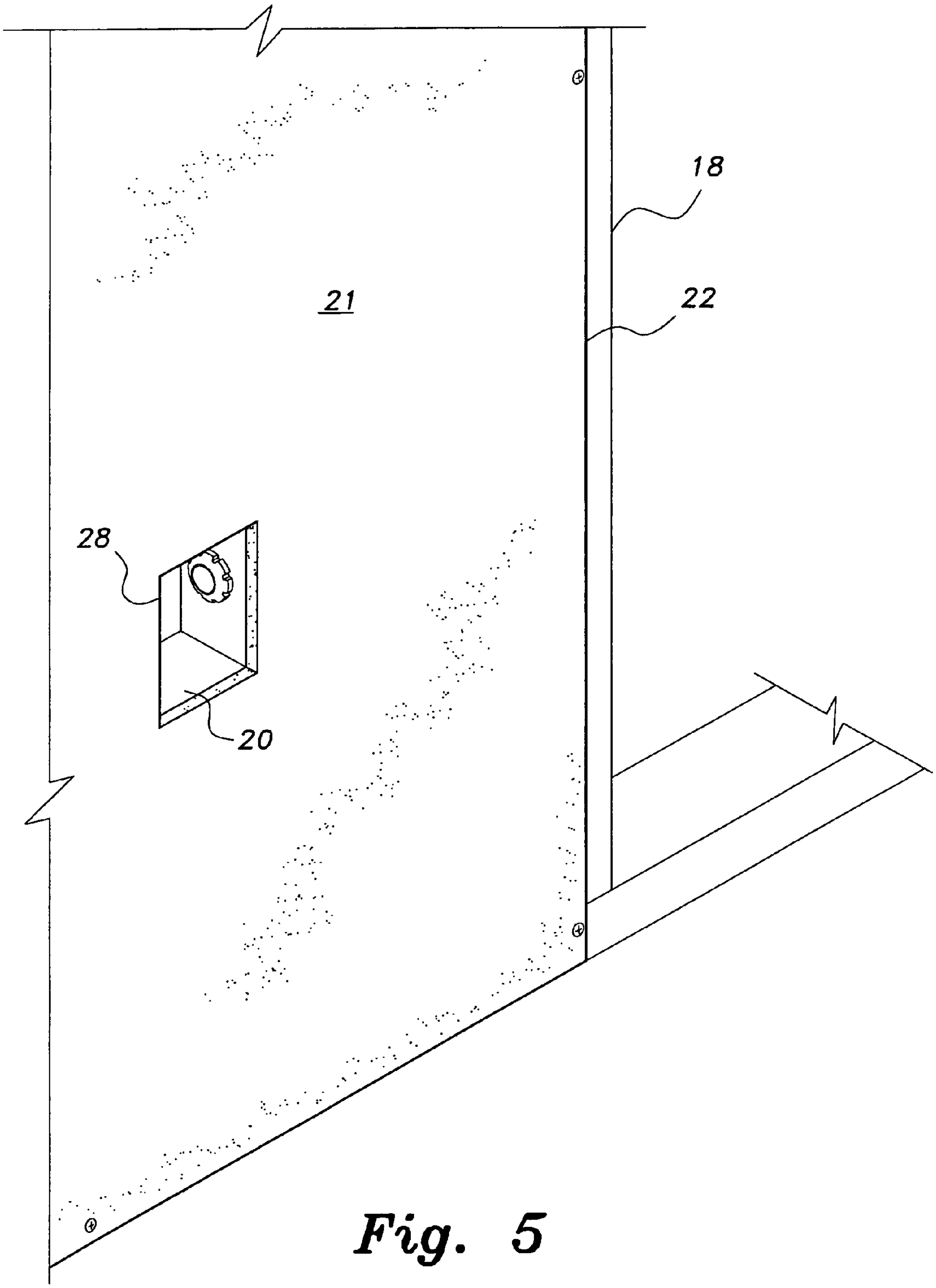
FIG. 5 is an environmental perspective view of the drywall of FIGS. 2-4 after cutting the opening in the drywall and attaching the drywall to the framing studs.

Once the opening 28 has been formed through the drywall panel 22, the user may then permanently secure the drywall panel 22 to studs 18 (as shown in FIG. 5) with drywall screws or the like so that the front face 21 of the drywall panel 22 faces outwardly (i.e., towards the interior of the building structure), with the opening 28 being formed directly over the electrical box 20.

As noted above, although an electrical box 20 is shown for exemplary purposes in FIGS. 2-5, marking sheet 10 may be sized and contoured to cover any suitable frame opening. Alternatively, a plurality of marking sheets 10 may be used to form guide images on drywall panels representing larger housings, such as the frame structures for doors and windows. In FIG. 6A, an exemplary door frame 34 is defined by the floor, a pair of vertical side frame members 32, and an upper horizontal frame member 30.

As shown in FIG. 6A, a pair of marking sheets 10 are adhered to the upper corners of the door frame 34 in a manner similar to that described above with respect to electrical box 20. Similarly, a second pair of marking sheets 10 are adhered to the lower corners of door frame 34. Drywall panels, such as drywall panel 22, are conventionally mounted to studs 18 so that panels 22 extend in the horizontal direction across the door frame opening 34 and at least one spaced apart pair of wall studs on each side of the door frame opening 34.

Typically, the height of a horizontally arranged drywall panel (herein denoted as L) is approximately four feet. Thus, at least one more pair of marking sheets 10 will ordinarily be necessary to form an image 26 of the door frame on multiple drywall panels. In FIG. 6A, an additional pair of marking sheets 10 are shown as being mounted to vertical side frame members 32, each being positioned a distance L from the respective upper and lower marking sheets 10. It should be understood that the frame elements making up the door frame 34 project outwardly, beyond the plane of studs 18, thus allowing proper images of the frame boundary to be transferred to the drywall. Similarly, as shown above with respect to electrical box 20, it is preferable for the electrical box, frame elements or other construction elements forming the opening to have a substantially raised profile in order to generate a better image of the opening or frame perimeter.

Following application of the exemplary six marking sheets 10, a pair of drywall panels 22, each having a height L, may be temporarily and releasably fixed to the studs 18 to transfer marking images to the rear faces of the drywall panels 22 in a manner similar to that described above with reference to FIGS. 2-5. Once the marking images have been transferred, the user may remove the panels from studs 18 and, using a ruler or the like, connect the marking images with a pencil or other suitable marking implement, to form a guide template for cutting the drywall. The drywall panels are then cut, each panel 22 being cut into two pieces to form the wall surface on opposite sides of the door frame 34, and permanently mounted to studs 18 so that the opening for a door matches the door frame 34. Alternatively, for skilled craftsmen, the step of drawing a line with a pencil or the like may be skipped, and the user may cut between marks with a utility knife or the like, thus eliminating tracing with the pencil. Preferably, a straight edge is employed to connect adjacent images, and the cutting tool is drawn along the straight edge, between the markings.

Following the formation of image 26 on the drywall panel, or panels, 22, the marking sheet 10 is removed from the housing 20 or frame 34. The marking sheet 10 may then be disposed of or, alternatively, the cover slip 1 6 may be reapplied to the adhesive layer 13 for storage and transport of the marking sheet 10 for future reuse thereof.

In another example, FIG. 6B illustrates a window frame 41 formed from upper and lower frame members 35, 37, respectively, and a pair of side frame members 39. In a manner similar to that described above with regard to FIG. 6B, a plurality of sheets 10 are mounted to the frame members 35, 37, 39 in order to transfer images of the frame boundaries to a sheet of drywall. It should be noted that frame members 35, 37, 39 project beyond the plane of studs 18, allowing for the proper formation of the images due to their raised profiles. In FIG. 2, the marking sheet 10 is applied to the electrical box 20. Similarly, in the exemplary embodiments of FIGS. 6A and 6B, the marking sheets 10 are applied to the frame elements, rather than the supporting studs.

In FIG. 6B, the marking sheets 10 are further shown as being torn from the roll R of FIG. 1C. The roll R may comprise a roll of sheets separated by perforations for ease in separating the sheets, or may comprise a nonperforated roll that can be torn or cut to any desired length. Although shown as producing single sheets 10, it should be understood that the user may use a marking sheet 10 of any desired length. For example, as shown in FIG. 6C, rather than using a single marking sheet 10 at each corner, the user may remove a single elongated strip of marking sheet 10 from roll R that extends along the entire length of the frame, thus covering one entire side, top or bottom board of the frame with a full length of strip of marking sheet 10. Particularly, when applying the marking panel to a circular or octagonal window frame, for example, the user may remove a single length of the marking tape and cover the entire border with the single length marking tape, thus allowing for transfer of the entire image from a single, measured length of marking tape.

FIGS. 2-6B illustrate the marking sheet 10 being used to form a guide template image 26 on the rear face of a drywall panel 22 for the formation of openings 28 dimensioned and configured to match a frame defining an opening required in a wall of a building. It should be understood that FIGS. 2-6B represent exemplary embodiments, and that marking sheets 10 may be used to form an opening for plumbing pipes, electrical conduit, ventilation ducts, or any other element that must pass through or mount flush with a wall. The marking sheets 10 may used to form a guide image for cutting sheet rock, tile floors, plywood or any other suitable building panel or structure, rather than just the exemplary drywall panels 22.

In the above, when applying pressure to relatively harder surfaces for transfer of the markings, such as plywood, backer board, cement board, wood paneling, wonder board, etc. a rubber mallet or other tool may be used to apply pressure to the surface, rather than the user's hand(s). Further, it should be understood that the roll of marking tape may be produced in any desired sizes, colors or shapes.

It is to be understood that the present invention is not limited to the embodiments described above, but encompasses any and all embodiments within the scope of the following claims.

We claim:

1. A marking tool for cutting a workpiece, consisting of:

an elongated base sheet coiled to form a roll;

a layer of transferable media disposed on the front surface of the base sheet to define a marking layer; and a layer of adhesive completely covering the rear surface of the base sheet adapted for attaching to the respective edge members defining a periphery of an opening in a fixture;

wherein, the base sheet may be uncoiled from the roll to a desired length and separated from the roll as a single sheet or group of sheets attachable to the periphery so that an image of the opening is formed on a rear face of the workpiece when the workpiece is pressed against the transferable media to form a template for cutting a corresponding opening in the workpiece.

2. The marking tool as recited in claim 1, further comprising a cover sheet releasably secured to the adhesive layer.

3. The marking tool as recited in claim 1, wherein elongated base sheet has perforated lines dividing the roll into separate base sheets when the perforated lines are torn.

4. The marking tool as recited in claim 1, wherein the transferable media is selected from the group consisting of pigments, ink, paint, carbon particles, wax, chalk and charcoal.

5. The marking tool as recited in claim 1, wherein said base sheet is made from a material selected from the group consisting of paper, plastic and cardboard.

6. A method for forming an opening in a workpiece during construction of a building, comprising the steps of:

providing a marking sheet roll;

separating a length of marking sheet from the roll to form at least one marking sheet;

temporarily attaching the at least one marking sheet to a building frame element defining a periphery of the opening, the at least one marking sheet having a layer of transferable media facing outward from the building frame element;

temporarily attaching the workpiece to the building frame over the at least one marking sheet;

pressing the workpiece against the at least one marking sheet in order to form an image of the opening on the workpiece;

removing the workpiece from the building frame;

cutting an opening in the workpiece, using the image as a template;

removing the workpiece from the building frame element defining the opening; and permanently attaching the workpiece to the building frame with the opening in the workpiece aligned with the building frame element defining the opening.

7. The method for forming an opening according to claim 6, wherein said step of temporarily attaching the at least one marking sheet comprises temporarily attaching the at least one marking sheet to a periphery of an electrical box supported between adjacent wall studs, the periphery of the electrical box defining the periphery of the opening.

8. The method for forming an opening according to claim 6, wherein said step of temporarily attaching the at least one marking sheet comprises temporarily attaching the at least one marking sheet to a periphery of an HVAC duct supported between adjacent wall studs, the periphery of the duct defining the periphery of the opening.

9. The method for forming an opening according to claim 6, wherein said step of temporarily attaching the at least one marking sheet comprises temporarily attaching the at least one marking sheet to an end of a plumbing pipe supported between adjacent wall studs, the end of the pipe defining the periphery of the opening.

10. A method for forming an opening in a workpiece during construction of a building, comprising the steps of:

providing a marking sheet roll;

separating a plurality of lengths of marking sheet from the roll to form a plurality of marking sheets;

temporarily attaching the marking sheets to building frame members defining a border of an opening in a building at each of the border of the opening, each of the marking sheets having a layer of transferable media facing outward from the building frame members;

temporarily attaching the workpiece to the building frame members over the marking sheets;

pressing the workpiece against the marking sheets in order to form images marking the border of the opening on the workpiece;

removing the workpiece from the building frame;

cutting the workpiece, using the images as a template;

removing the marking sheets from the building frame members defining the border of the opening; and permanently attaching the workpiece to the building frame around the building opening.

11. The method for forming an opening in a work piece according to claim 10, wherein the building frame members define a window opening, said step of cutting the workpiece comprising cutting an opening in a single panel of drywall.

12. The method for forming an opening in a workpiece according to claim 10, further comprising the step of drawing lines on the panel of drywall between the images in order to define an outline of the window opening after removing the panel of drywall from the building frame and before cutting the panel of drywall.

13. The method for forming an opening in a workpiece according to claim 10, wherein the building frame members define an elongated door opening, the method further comprising the step of temporarily attaching intermediate marking sheets to building frame members intermediate the border of the opening.

14. The method for forming an opening in a workpiece according to claim 13, further comprising the step of drawing lines on the workpiece between the images in order to define an outline of the door opening after removing the workpiece from the building frame and before cutting the workpiece.

15. The method for forming an opening in a workpiece according to claim 13, wherein said step of cutting the workpiece comprises cutting the workpiece into two separate sections, said step of permanently attaching the workpiece comprising the step of installing the separate sections of the workpiece on opposite sides of the door opening.

16. The method for forming an opening in a workpiece according to claim 10, further comprising the step of positioning a straight edge connecting adjacent markings and cutting lines on the workpiece between the images.

* * * * *